United States Patent
Guerard

(10) Patent No.: US 11,046,064 B2
(45) Date of Patent: Jun. 29, 2021

(54) METHOD FOR PRODUCING A MICROCIRCUIT CARD COMPRISING A FLEX CIRCUIT IN A CAVITY BY HOT LAMINATION

(71) Applicant: IDEMIA France, Colombes (FR)

(72) Inventor: Denis Guerard, Colombes (FR)

(73) Assignee: IDEMIA FRANCE, Courbevoie (FR)

( * ) Notice: Subject to any disclaimer, the term of this patent is extended or adjusted under 35 U.S.C. 154(b) by 178 days.

(21) Appl. No.: 16/064,778

(22) PCT Filed: Dec. 16, 2016

(86) PCT No.: PCT/FR2016/053534
§ 371 (c)(1),
(2) Date: Jun. 21, 2018

(87) PCT Pub. No.: WO2017/109363
PCT Pub. Date: Jun. 29, 2017

(65) Prior Publication Data
US 2019/0009511 A1 Jan. 10, 2019

(30) Foreign Application Priority Data
Dec. 22, 2015 (FR) ...................... 1563148

(51) Int. Cl.
*B32B 37/00* (2006.01)
*B32B 33/00* (2006.01)
(Continued)

(52) U.S. Cl.
CPC .......... *B32B 37/0015* (2013.01); *B32B 33/00* (2013.01); *B32B 37/02* (2013.01);
(Continued)

(58) Field of Classification Search
None
See application file for complete search history.

(56) References Cited

U.S. PATENT DOCUMENTS

| 2006/0181478 A1* | 8/2006 | Benato .................. B32B 37/04 343/895 |
| 2010/0012731 A1* | 1/2010 | Droz ...................... H05K 3/24 235/488 |

(Continued)

FOREIGN PATENT DOCUMENTS

FR   2 982 058   5/2013

OTHER PUBLICATIONS https://docplayer.net/39041530-Introduction-to-petf-a-track-record-in-durable-cards.html (Year: 2011).*

(Continued)

*Primary Examiner* — Barbara J Musser
(74) *Attorney, Agent, or Firm* — Nixon & Vanderhye

(57) ABSTRACT

The method for producing a microcircuit card including a film having a very low level of shrinkage between two overlay layers, carrying at least one electronic component and an assembly of layers in which a cavity is formed containing the film and the electronic component, involves: forming the assembly to include a central layer 16 made from a material having a very low level of shrinkage between two layers of a plastic material having a substantially higher level of shrinkage, for example PVC, forming, through the assembly, a cavity of which the surface area advantageously equals between 30% and 90% of the surface area of the outer faces of the microcircuit card that is to be produced, embedding the film and the electronic component in a resin so as to occupy the space in the cavity and laminating the two overlay layers.

8 Claims, 1 Drawing Sheet

Figure 1:
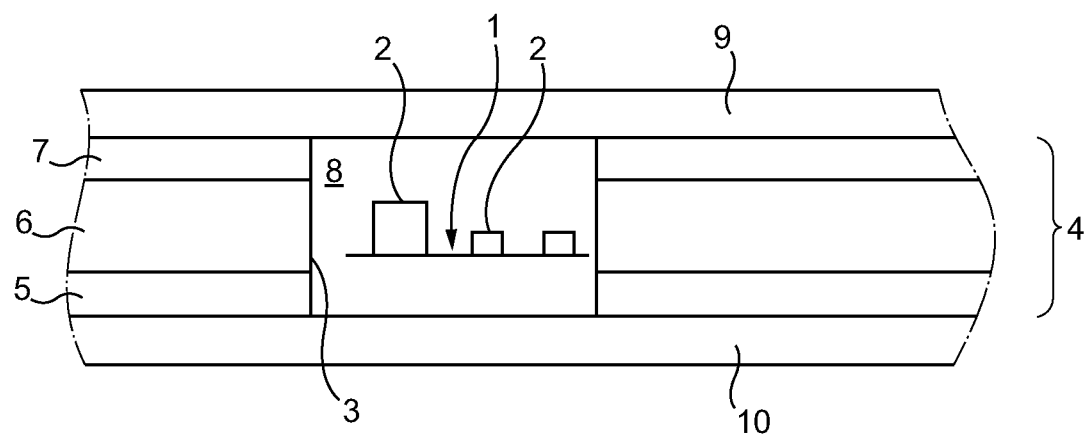

(51) Int. Cl.
*B32B 37/02* (2006.01)
*B42D 25/45* (2014.01)
*G06K 19/077* (2006.01)
*B42D 25/455* (2014.01)

(52) U.S. Cl.
CPC .......... *B42D 25/45* (2014.10); *B42D 25/455* (2014.10); *G06K 19/07722* (2013.01); *G06K 19/07745* (2013.01); *B32B 2305/342* (2013.01); *B32B 2307/734* (2013.01); *B32B 2307/75* (2013.01); *B32B 2309/105* (2013.01); *B32B 2327/06* (2013.01); *B32B 2425/00* (2013.01)

(56) References Cited

U.S. PATENT DOCUMENTS

| | | | | |
|---|---|---|---|---|
| 2010/0226107 | A1* | 9/2010 | Rietzler | B29C 39/025 |
| | | | | 361/760 |
| 2013/0255078 | A1* | 10/2013 | Cox | G06K 19/07745 |
| | | | | 29/830 |
| 2014/0021261 | A1* | 1/2014 | Mosteller | B32B 15/08 |
| | | | | 235/488 |

OTHER PUBLICATIONS

International Search Report, PCT/FR2016/053534, dated Apr. 25, 2017.
"Introduction to PETF", DuPont Teijin Films, Dec. 31, 2011 (Dec. 31, 2011), XP055302386, Retrieved from the Internet: URL:http://europe.dupontteijinfilms.com/media/56672/petf for durable cards.pdf [retrieved on Sep. 14, 2016]-pp. 10,11.

* cited by examiner

METHOD FOR PRODUCING A MICROCIRCUIT CARD COMPRISING A FLEX CIRCUIT IN A CAVITY BY HOT LAMINATION

FIELD OF THE INVENTION

The invention relates to a method for manufacturing a microcircuit card (sometimes referred to as a chip card) by lamination that aims to ensure the flatness thereof, even when this card is inhomogeneous or complex.

Such inhomogeneity or complexity may in particular be observed regarding a chip card comprising electronic components such as those necessary for the dynamic display of a verification code of a bank card.

Prior Art and Problem to be Solved

As is known, such electronic components are first mounted on a support made of PET (polyethylene terephthalate) or of PI (polyimide), PEN (polyethylene naphthalate), a piece of metal, etc., the assembly being referred to as a flex circuit.

The card body is laminated in the sense that it comprises a set of inner substrates between two outer layers (referred to as overlays).

Certain inner layers may already have been complexed together (by lamination, adhesive bonding, etc.). By convention, irrespective of the complexing method, this set of layers is referred to as a "prelam".

The substrates of the prelam and the overlays are conventionally made of PVC.

In order to manufacture a prelam of a complex card, all of the inner substrates made of PVC are (hot or cold) laminated, then a through-hole is cut through the thickness of the prelam. The flex circuit is positioned in the hole and resin is deposited, then cured in an appropriate manner (curing by UV irradiation, by redox, by catalysis, by heating, etc.). After curing of the resin, the flex circuit is held in place and fastened to the prelam. The hole is in practice barely any bigger than the flex circuit to be placed therein.

It is then possible to integrate the prelam between two overlay substrates which have, in practice, been printed upon.

The complex card may further comprise a module comprising, on one side, pads for connection by contact with an external reader and, on another side, at least one microcircuit to which the connection pads are connected, as known for "contact" cards.

Today, the integration of the prelam between the two overlays is carried out by a cold lamination.

However, a cold lamination is a slower technology than the techniques of hot lamination of plastic layers, and may lead to very long manufacturing cycles that are incompatible with the production rates.

As regards hot lamination techniques, they are used more, better controlled and faster than cold lamination, but they have the drawback of involving high temperatures, typically of the order of 130° C. (or even more), to which the various constituent materials of the future card have different behaviors.

More specifically, after a hot lamination of the overlays, shrinkage phenomena of the plastics occur during the cooling (that is to say the opposite of the expansion phenomenon that takes place during the increase in temperature from ambient temperature up to the hot lamination temperature). The shrinkage is the process that leads to a reduction in the initial dimensions of a part that has undergone heating, then been cooled. In the present application, the expression "degree of shrinkage" or "shrinkage coefficient" is understood to mean a ratio or percentage of reduction of the initial dimensions of the part after a heat treatment. More particularly, in the present invention, the shrinkage is measured in the main plane of the card, the reduction in thickness being insignificant compared to the reduction in the plane of the card. The degree of shrinkage depends on the temperature to which the part is heated. The higher the temperature, the greater the degree of shrinkage.

The fact that the flex circuit and the prelam are formed of different materials results, in the case of hot lamination, in different shrinkage phenomena occurring, which results in the flatness of the card being impaired in a manner that is incompatible with the quality standards required.

More specifically, the materials constituting the flex circuit, especially polyimide, PET (polyethylene terephthalate), PEN (polyethylene naphthalate), have expansion, or shrinkage, coefficients of less than 1, very close to zero, whereas the constituent materials (in practice PVC, ABS, PLA, PC, PETg) of the prelam, surrounding the cavity occupied by the flex circuit, have expansion/shrinkage coefficients of several percent at 130° C., typically of around 3% or even more, that may reach around 5%. It results therefrom that, during the cooling of the hot-laminated card, the shrinkage of the prelam and of the overlays tends to apply stresses on the flex circuit which, not exhibiting shrinkage, is forced to undulate (reference is made to a wave phenomenon, due to the surface reliefs caused by the displacement of the electronic components in the card body after undulation of the support of the flex circuit).

SUMMARY OF THE INVENTION

One subject of the invention is an arrangement of the layers of a chip card obtained by lamination that enables the use of a hot lamination technique, at a temperature that may reach or even exceed 130° C., without detrimentally affecting the flatness of the card finally obtained.

In order to do this, it proposes an arrangement of the structure of the prelam of such a card; more specifically, it proposes a prelam formed of a complex of plastics, of which the shrinkage properties are close to those of the flex circuit which is assembled therewith, i.e. a prelam that is hardly deformed at all after a hot lamination.

The invention thus proposes a process for manufacturing a microcircuit card comprising, between two overlay layers forming the outer faces of this card, a plastic film having a degree of shrinkage of less than 1% after heating between 100° C. and 250° C. and bearing at least one electronic component and an assembly of layers wherein a cavity is formed that contains said film and the electronic component, according to which:
said assembly is formed so that it comprises a central layer made of a plastic, of which the degree of shrinkage is less than 1% after heating between 100° C. and 250° C. between two layers made of a plastic having a degree of shrinkage of between 3% and 5% after heating between 100° C. and 250° C.,
a cavity is formed through this assembly,
the film and the electronic component are embedded in a resin so as to occupy the volume of the cavity,
this assembly of layers comprising the resin and the film with the electronic component are hot laminated, at a temperature of at least 110° C., between two transparent overlay layers, so as to obtain a microcircuit card having flat faces.

Advantageously, the film is made of polyimide. The overlay layers are preferably transparent. Furthermore, said assembly is advantageously formed of a central layer made of biaxially-oriented polyethylene terephthalate, or PETf, between two layers of polyvinyl chloride, or PVC, of equal thicknesses.

Also advantageously, the central layer has a thickness at most equal to 300 micrometers and representing between 25% and 150% of the thickness of each of the layers of equal thicknesses.

The cavity is in practice a through-cavity. Advantageously, its surface area is equal to between 60% and 90% of the surface area of the outer faces of the microcircuit card to be manufactured.

The overlay layers are advantageously formed of a printing layer bordered externally by a transparent layer.

Preferably, the layers of plastic forming the microcircuit card are symmetrical (in nature and in thickness) relative to the central layer (more specifically relative to a plane passing through the central layer). In other words, the card has a symmetrical structure relative to a plane of symmetry of the central layer so as to prevent as best possible the effect of waves or undulation.

Advantageously, the two PVC layers are split into two sublayers, which facilitates the integration of components in these layers (at the interface between the sublayers or within one of them). The sublayers bordering the central layer have, for example, a thickness of at least 150% of the thickness of the sublayers bordering the transparent overlay layers.

Advantageously, in one of the PVC layers, at least one component (for example a contactless external communication antenna) is formed which is connected to a microcircuit that the microcircuit card to be manufactured comprises.

According to another aspect, the invention proposes a microcircuit card obtained by the aforementioned process, comprising between two overlay layers forming the outer faces of this card, a film made of a plastic having a degree of shrinkage of less than 1% after heating between 100° C. and 250° C. and bearing at least one electronic component and an assembly of at least three layers wherein a cavity is formed that contains said film and the electronic component, wherein:

said assembly of layers comprises a central layer made of a plastic, of which the degree of shrinkage is less than 1% after heating between 100° C. and 250° C., between two layers made of plastic, of which the degree of shrinkage is between 3% and 5% after heating between 100° C. and 250° C., the film and the electronic component being embedded in a resin occupying the volume of the cavity, this microcircuit card having flat outer faces.

By analogy with that which was indicated with regard to the process, advantageously:

the two overlay layers are transparent,
the film is made of polyimide,
the central layer is made of biaxially-oriented polyethylene terephthalate or PETf,
the two layers between which this central layer is sandwiched are made of polyvinyl chloride or PVC, these layers preferably being of equal thicknesses,
the central layer has for example a thickness at most equal to 300 micrometers and representing between 20% and 150% of the thickness of each of the layers between which it is sandwiched, the cavity passes through the assembly of the central layer and of the layers between which this central layer is sandwiched, the surface area of the cavity is equal to between 60% and 90% of the surface of the surface area of the surface area of the outer faces of the microcircuit card, the overlay layers are advantageously formed of a printing layer bordered externally by a transparent layer, the layers of plastic forming the microcircuit card are symmetrical (in nature and in thickness) relative to a plane passing through the central layer, the two layers sandwiching the central layer are split into two sublayers, the sublayers bordering the central layer have a thickness of at least 150% of the thickness of the sublayers bordering the transparent overlay layers, at least one component is formed in one of the PVC layers which is connected to a microcircuit that the microcircuit card to be manufactured comprises; this is for example a contactless external communication antenna.

Lastly, the invention relates to the intermediate product constituted by the assembly of layers forming the prelam, namely an assembly of layers for the implementation of the aforementioned process for the manufacture of a microcircuit card of the type that has just been defined, wherein:

said assembly of layers comprises a central layer made of a plastic, of which the degree of shrinkage is less than 1% after heating between 100° C. and 250° C., for example biaxially-oriented polyethylene terephthalate, or PETf, between two layers made of a plastic, of which the degree of shrinkage is between 3% and 5% after heating between 100° C. and 250° C., for example made of polyvinyl chloride, or PVC, of advantageously equal thicknesses, this central layer having for example a thickness at most equal to 300 micrometers and representing between 75% and 150% of each of the two layers that sandwich it, a cavity passes through the whole of the assembly of layers, having a surface area that is preferably equal to between 30% and 90% of the surface area of the outer faces of the microcircuit card to be manufactured.

DESCRIPTION OF THE INVENTION

Figure 2:
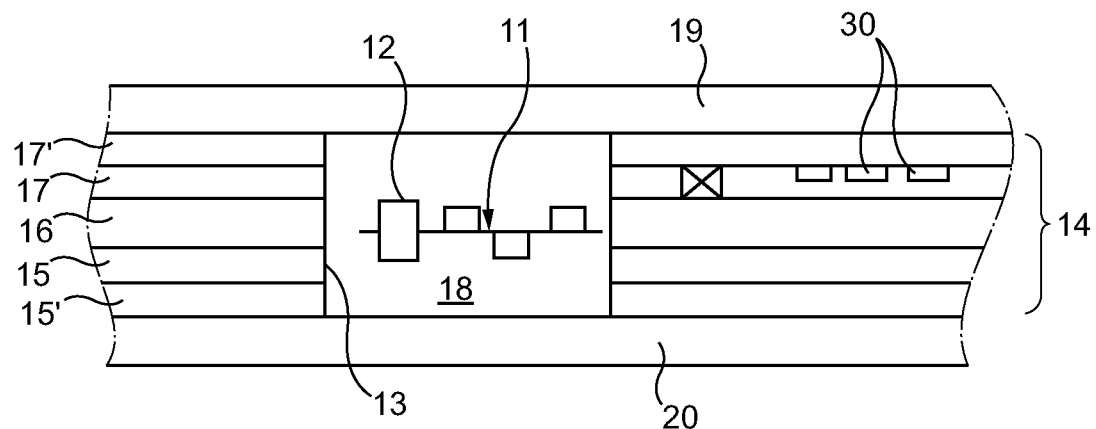

Objectives, features and advantages of the invention will become apparent from the following description, given by way of nonlimiting illustrative example, with regard to the appended drawing, in which:

FIG. 1 is a partial cross-sectional view of a card obtained by cold lamination, in a known manner, and FIG. 2 is a partial cross-sectional view of a card obtained by hot lamination, in accordance with the invention.

The microcircuit card represented in part in FIG. 1 comprises, in a known manner, a flex circuit 1, bearing electronic components 2 and mounted within a cavity 3 formed inside a prelam 4 formed of several layers, here three layers, namely the layers 5 to 7. The flex circuit is embedded in a mass of resin 8 which fills the cavity; two overlay layers 9 and 10 cover the lower and upper faces of the prelam and of the mass of resin encompassing the flex circuit. The cavity is barely any bigger than the flex circuit, typically from 1 to 2 mm bigger, parallel to the flat faces of the card, than the contour of this flex circuit.

Conventionally, the central layer 6 of the prelam is made of PVC, as well as the layers 5 and 7 that sandwich this central layer; the overlay layers, which are customarily transparent, (optionally bordered by printing layers) are also formed of PVC. As indicated above, such a configuration must customarily be cold laminated, to prevent different expansion/shrinkage phenomena from giving rise to the appearance of undulations at the location of the cavity, locally giving rise to undulations of the overlay layers 9 and 10. Indeed, the shrinkage of the PVC layers, greater than that of the flex circuit, results in a reduction in the circumference of the hole. This reduction is sufficient to compress and undulate the flex circuit and the resin mainly in the plane of the card, which will result in deformations in the form of waves or undulations at the surface of the card.

In accordance with the invention, the card from FIG. 2 has a structure in which the various parts have shrinkage behaviors that are substantially identical in the case of hot lamination, thus preventing such a hot lamination from resulting in a poor flatness of the large faces of the final card.

In fact, as indicated above, one of the materials commonly used for the manufacture of a flex circuit is polyimide, abbreviated to PI, which has an expansion/shrinkage coefficient of virtually zero up to temperatures of around 130° C., that does not exceed 1% after heating at 250° C. However, other material is also known in the field of manufacturing chip cards, that the hot lamination operators therefore know how to handle in a reliable and effective manner; these are PVC (polyvinyl chloride), PC (polycarbonate), PEN (polyethylene naphthalate), PETg (polyethylene terephthalate glycol-modified), and also PETf (polyethylene terephthalate film, or biaxially-oriented PET).

Yet it has become apparent that PETf, customarily valued for reasons of environmental safety, and tear resistance and durability for a reasonable low production cost, has the distinctive feature of having an expansion/shrinkage coefficient of several fractions of a percent, typically between 0.5%-1%. However, the use of a PETf single layer can only be envisaged for thin substrates, since in practice a PETf layer having a thickness greater than 300 µm does not exist; moreover, PETf has printing and adhesive bonding properties that are much lower than those that are recognized for PVC in the chip card industry.

It became apparent that it was possible to combine PETf and PVC so as to combine the very low shrinkage of PETf and the exceptional printability and adhesive bonding properties of PVC, within a prelam containing a PI flex circuit formed of electronic components.

Thus, it was observed that, if the prelam is formed of a PETf layer between lower and upper layers of PVC or other plastics mentioned above, the undulation effect is eliminated since the PETf layer supports the PVC layers and prevents the latter from shrinking to a degree of greater than 1%. The wave phenomenon is therefore prevented.

Furthermore, if the prelam is formed of a central PETf layer between lower and upper layers of PVC of the same thickness (in other words, if the PETf layer, which is necessarily thin, is correctly centered in the middle of the thickness of the prelam furthermore formed of PVC), and/or if the cavity is a through-opening (therefore extending from one face to the other of the prelam) the area of which is equal to 60% to 90% of that of the prelam, no significant curvature/curling phenomenon occurs after a hot lamination (above 110° C., typically around 130° C., or even higher) between two overlay layers, typically made of PVC, that are optionally transparent.

Similar comments can be formulated with regard to PEN, the degree of shrinkage of which is also very low.

Thus, according to the invention, the curvature phenomenon, observed nevertheless in documents such as EP-0 488 574 or U.S. Pat. No. 6,644,552 with a PET layer in a PVC body, is not experienced.

In fact, it may be believed that this curvature effect is prevented due to this central position of the PETf layer, and also due to the fact that the through-cavity is large enough to limit the curvature effects (see the aforementioned range of around 60% to 90% of the total surface area of the card).

It is assumed that the aforementioned ratio of 60% to 90% of the area of the opening relative to the surface area of the card makes it possible to limit the effects of distortion between the PVC which shrinks and the PETf which barely shrinks at all, despite the thinness of this PETf layer relative to the thickness of the PVC layers. However it appears that if the cavity is smaller, its presence has no significant effect on the control of the shrinkage.

An example of a card according to the invention is thus formed, and is depicted in FIG. 2 (the thicknesses not being to scale for reasons of clarity of the drawing), of a prelam 14 formed of a central PETf layer 16, sandwiched between two PVC printing layers 15 and 17, and of a flex circuit 11 comprising electronic components 12, embedded in a resin 18 occupying, together with this flex circuit, the volume of a through-cavity 13 formed through this prelam. The assembly of this prelam and of this mass of resin is held and laminated between two overlay layers 19 and 20.

In the example represented, the layers 15 and 17 are in fact split (the layers 15 and 17 are respectively bordered by layers 15' and 17'), the layer 17 here containing turns of an antenna 30 by means of which the card partly represented may communicate contactlessly with an external terminal.

By way of example, for an overall thickness of 760 micrometers, namely the standardized thickness of a chip card in accordance with the ISO-7816 or ISO-14443 standard:

the central PETf layer has a thickness of 125 micrometers,
the layers 15 and 17 each have a thickness of 100 micrometers,
the layers 15' and 17' each have a thickness of 50 micrometers, and
the overlay layers, capable of receiving printing, each have a thickness of 168 micrometers.

In case of transparent overlay layers, these may, as a variant, have a thickness of 40-50 micrometers, being bordered internally by a printing layer having a thickness of around 110-120 micrometers.

Thus, the central PETf layer has here a thickness representing between 25% and 150% of that of each of the double PVC layers located above and below this layer.

The PVC layers between which the central PETf layer lies have a thickness substantially greater than the thickness of the PVC layers which are adjacent to the overlay layers; their thickness is for example between 150% and 250% of the thickness of these layers adjacent to the overlay layers. This enables the implantation of circuit elements connected to the microcircuit (not shown) of the chip card to be manufactured.

The resin coating the flex circuit is here an epoxy or acrylic resin derived from the same family as the resins used for coating the module. These are resins that are widely used in the electronics field.

Tests carried out at 130° C. show that the flatness of the cards with a prelam formed of such a PVC/PETf complex is widely acceptable unlike pure PVC cards.

The fact that the PETf does not generally adhere very well to the PVC may be overcome by a surface treatment that the PETf manufacturers know well; it is typically an addition, by coextrusion, of a very thin layer (1 to 10 µm) of copolymer. The thickness of this layer is so small that it has no influence on the shrinkage. There may in addition be a deposition of an (acrylic or other) adhesive to ensure the impermeability and/or the adhesion of the PET with another layer.

As indicated above, the PETf and the PVC are assembled by hot lamination if the PET is at the center; it is however understood that, if it is chosen to position the PETf layer in an off-centered manner (or if this layer does not exist), it is best to proceed by cold lamination (there is then no minimum surface area required for the cavity relative to the total surface area of the layers).

The PET can be replaced by PEN, in particular.

The electronic components may be visual display components or acquisition components, for example a fingerprint acquisition component or else a screen displaying a security code intended to be used in combination with a bank card identification number and an expiration date to carry out a payment; the card may be a bank card, typically in the ID-1 format as defined in the aforementioned ISO-7810 or ISO-7816 standard, of contact type, of contactless type or of dual type, i.e. a card enabling communication by contact with a certain type of external terminal and contactlessly with another type of external terminal; communication with the outside may be limited to what is referred to as near-field communication, namely a contactless communication with a range of barely a few tens of centimeters, or even barely a few centimeters.

The example considered above comprises a polyimide flex circuit but it is understood that the invention applies to any card formed of various materials having significantly different expansion/shrinkage coefficients but that it is desired to manufacture by hot lamination.

The invention claimed is:

1. A process for manufacturing a microcircuit card having two overlay layers forming outer faces and a plastic film therebetween, the plastic film having a degree of shrinkage less than 1% after heating between 100° C. and 250° C., the plastic film bearing an electronic component and the microcircuit card bearing an assembly of layers having a cavity formed therein that contains the plastic film and the electronic component, the process comprising steps of:

forming the assembly so as to comprise two plastic layers and a central layer, the central layer formed of a plastic having a degree of shrinkage less than 1% after heating between 100° C. and 250° C., and the central layer is positioned between the two plastic layers, the two plastic layers having a degree of shrinkage between 3% and 5% after heating between 100° C. and 250° C.;

forming the cavity in and through the assembly;

mounting the plastic film and the electric component within the cavity such that all outer edges of the plastic film are inside the cavity;

embedding the plastic film and the electronic component within the cavity in a resin such that the resin occupies the volume of the cavity in the assembly and such that the resin encompasses the plastic film; and hot laminating, at a temperature of at least 110° C., the assembly comprising the resin and the plastic film with the electronic component, between said two overlay layers covering the cavity and the lower and upper faces of the assembly so as to obtain the microcircuit card with flat outer faces, wherein the cavity formed in the assembly is a through-cavity, and the surface area of the cavity is between 60% and 90% of the surface area of the outer faces.

2. The process as claimed in claim 1, wherein the plastic film is made of polyimide, and the central layer of the assembly is made of biaxially-oriented polyethylene terephthalate, and the two plastic layers of the assembly are made of polyvinyl chloride and have equal thicknesses.

3. The process as claimed in claim 2, wherein the central layer has a thickness at most equal to 300 micrometers and represents between 25% and 150% of each of the two layers plastic between which the central layer is sandwiched.

4. The process as claimed in claim 1, wherein the central layer has a thickness at most equal to 300 micrometers and represents between 25% and 150% of each of the two layers plastic between which the central layer is sandwiched.

5. The process as claimed in claim 1, wherein the two plastic layers are symmetrical relative to the central layer.

6. The process as claimed in claim 1, wherein the two plastic layers are formed of first sublayers and second sublayers.

7. The process as claimed in claim 6, wherein the first sublayers bordering the central layer have a thickness of at least 150% of a thickness of the second sublayers bordering the overlay layers.

8. The process as claimed in claim 1, wherein, within one layer of said assembly located on a side of the central layer, at least one additional component is formed which is connected to a microcircuit of the microcircuit card.

* * * * *